(12) United States Patent
Xiang et al.

(10) Patent No.: US 12,236,566 B2
(45) Date of Patent: Feb. 25, 2025

(54) ANOMALY DETECTION DEVICE, ANOMALY DETECTION METHOD, AND ANOMALY DETECTION PROGRAM

(71) Applicant: KABUSHIKI KAISHA TOSHIBA, Tokyo (JP)

(72) Inventors: Yun Xiang, Tokyo (JP); Satoshi Ito, Kawaski Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 560 days.

(21) Appl. No.: 17/685,269

(22) Filed: Mar. 2, 2022

(65) Prior Publication Data
US 2022/0405911 A1 Dec. 22, 2022

(30) Foreign Application Priority Data
Jun. 16, 2021 (JP) .................... 2021-100236

(51) Int. Cl.
*G06T 7/00* (2017.01)
*G06F 3/14* (2006.01)
*G06T 7/73* (2017.01)

(52) U.S. Cl.
CPC .............. *G06T 7/0002* (2013.01); *G06F 3/14* (2013.01); *G06T 7/73* (2017.01); *G06T 2207/10016* (2013.01); *G06T 2207/20076* (2013.01); *G06T 2207/20081* (2013.01)

(58) Field of Classification Search
CPC ...................... G06T 7/0002; G06T 7/73; G06T 2207/10016; G06T 2207/20081; G06T 2207/20084; G06F 3/14
See application file for complete search history.

(56) References Cited

U.S. PATENT DOCUMENTS

| 2018/0293723 | A1* | 10/2018 | Bae ..................... G06F 18/2115 |
| 2020/0184252 | A1* | 6/2020 | Syeda-Mahmood .. G06V 10/26 |
| 2022/0301140 | A1* | 9/2022 | Kawamura ............. G06F 18/22 |
| 2023/0281959 | A1* | 9/2023 | Hoshen .................. G06N 3/045 |
| | | | 382/225 |

FOREIGN PATENT DOCUMENTS

JP 2020181532 A 11/2020

OTHER PUBLICATIONS

Paul Bergmann et al., "Uninformed Students: Student-Teacher Anomaly Detection with Discriminative Latent Embeddings", CVPR, 2020, pp. 4183-4192.
U.S. Appl. No. 17/400,299, to Kawamura, filed Aug. 12, 2021.

\* cited by examiner

*Primary Examiner* — Ping Y Hsieh
*Assistant Examiner* — Jose M Torres
(74) *Attorney, Agent, or Firm* — Kim & Stewart LLP

(57) ABSTRACT

According to one embodiment, an anomaly detection device includes a processor that is configured to acquire input data. The processor derives a first anomaly degree corresponding to a difference between first feature data derived from the input data using a trained deep model and second feature data derived from the input data using a trained prediction model. The processor derives a second anomaly degree corresponding to an estimated relative positional relationship between a first and second region in the image data based on the second feature data. A total anomaly degree for the input data is then calculated from the first anomaly degree and the second anomaly degree.

20 Claims, 10 Drawing Sheets

POSITION ANOMALY
34(35)
34A
34B
34C
SHAPE ANOMALY

| HEAT MAP OF TOTAL ANOMALY DEGREE | HEAT MAP WHERE FIRST ANOMALY DEGREE AND SECOND ANOMALY DEGREE ARE SUPERIMPOSED |
|---|---|
| HEAT MAP OF FIRST ANOMALY DEGREE | HEAT MAP OF SECOND ANOMALY DEGREE |

| HEAT MAP OF LABEL 1 OF SECOND ANOMALY DEGREE | HEAT MAP OF LABEL 2 OF SECOND ANOMALY DEGREE | HEAT MAP OF LABEL 3 OF SECOND ANOMALY DEGREE |
|---|---|---|
| HEAT MAP OF LABEL 4 OF SECOND ANOMALY DEGREE | HEAT MAP OF FIRST ANOMALY DEGREE | HEAT MAP OF LABEL 5 OF SECOND ANOMALY DEGREE |
| HEAT MAP OF LABEL 6 OF SECOND ANOMALY DEGREE | HEAT MAP OF LABEL 7 OF SECOND ANOMALY DEGREE | HEAT MAP OF LABEL 8 OF SECOND ANOMALY DEGREE |

ANOMALY DETECTION DEVICE, ANOMALY DETECTION METHOD, AND ANOMALY DETECTION PROGRAM

CROSS-REFERENCE TO RELATED APPLICATION

This application is based upon and claims the benefit of priority from Japanese Patent Application No. 2021-100236, filed Jun. 16, 2021, the entire contents of which are incorporated herein by reference.

FIELD

Embodiments described herein relate generally to an anomaly detection device, an anomaly detection method, and an anomaly detection program.

BACKGROUND

A system for detecting an anomaly contained in input data such as an image is known. For example, a technique for determining normality by comparing an error between input data and output data restored from the characteristics of the input data is disclosed. Furthermore, a method for performing anomaly detection by using a prediction error between a feature data derived by using a trained deep model and a feature data derived by using a prediction model has been disclosed.

However, in the related art, it is difficult to detect as an anomaly a region included in the input data which is a locally normal region but is abnormal in its positional relationship with other regions. Therefore, in the related art, the anomaly detection accuracy may be lowered.

BRIEF DESCRIPTION OF THE DRAWINGS

FIG. 9A is a schematic diagram of a display screen.
FIG. 9B is another schematic diagram of a display screen.

DETAILED DESCRIPTION

Embodiments provide an anomaly detection device, an anomaly detection method, and an anomaly detection program capable of improving anomaly detection accuracy.

In general, according to one embodiment, an anomaly detection device includes a processor. The processor is configured to acquire input data including image data. The processor then derives a first anomaly degree corresponding to a difference between first feature data derived from the input data using a trained deep model trained using natural data and second feature data derived from the input data using a prediction model trained using target data and a second anomaly degree corresponding to an estimated relative positional relationship between a first region in the image data and a second region in the image data based on the second feature data. At least a part of the second region is not overlapping with the first region. The processor then calculates a total anomaly degree for the input data from the first anomaly degree and the second anomaly degree.

Certain example embodiments of an anomaly detection device, an anomaly detection method, and an anomaly detection program will be described in reference to the accompanying drawings.

Figure 1:
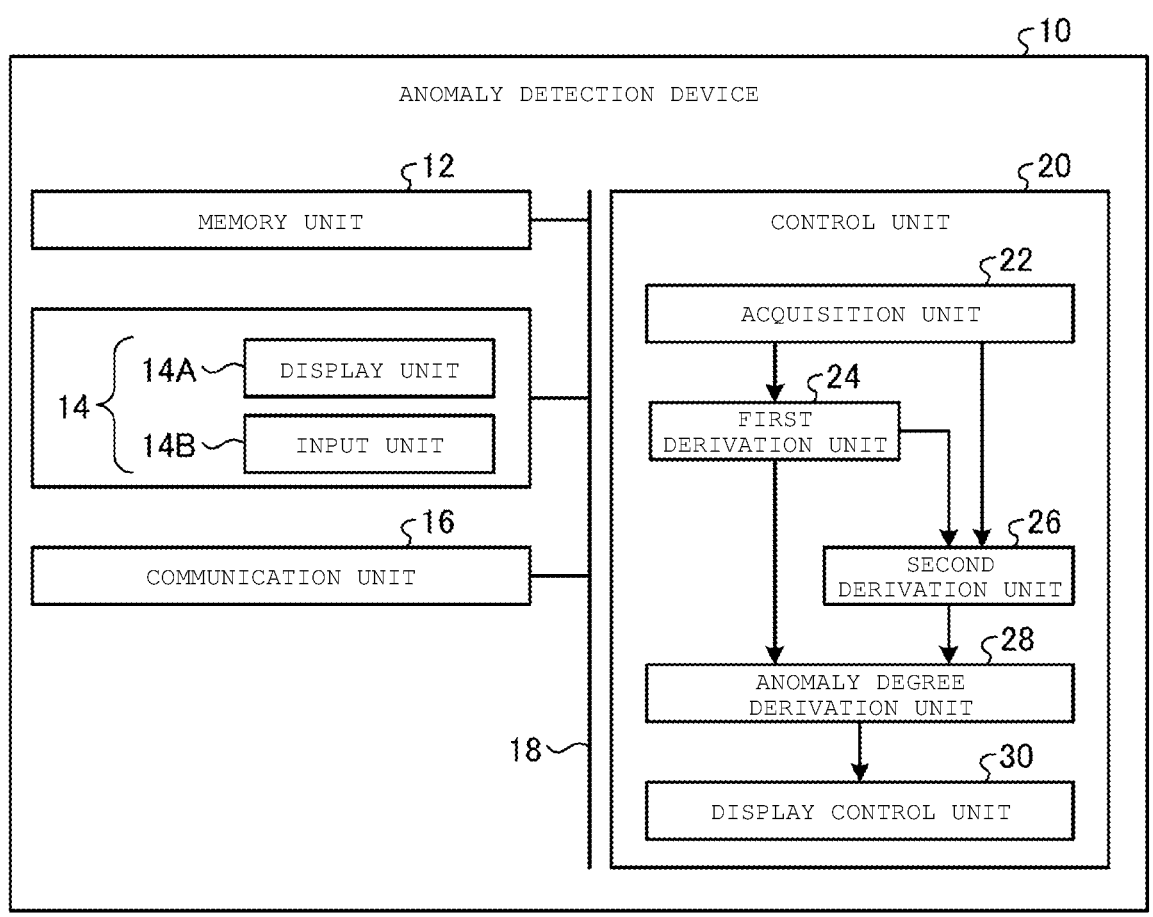
FIG. 1 is a block diagram of an anomaly detection device.

FIG. 1 is a block diagram showing an example of the configuration of an anomaly detection device 10.

The anomaly detection device 10 is a device that detects anomalies included in input data.

The anomaly detection device 10 includes a memory unit 12, a user interface (UI) unit 14, a communication unit 16, and a control unit 20. The memory unit 12, the UI unit 14, the communication unit 16, and the control unit 20 are communicably connected via a bus 18 or the like.

The memory unit 12 stores various types of information. The memory unit 12 is, for example, a random access memory (RAM), a semiconductor memory element such as a flash memory, a hard disk, an optical disk, or the like. The memory unit 12 may be a storage device provided outside the anomaly detection device 10. For example, the memory unit 12 may be mounted on an external information processing device connected to the anomaly detection device 10 via a network or the like.

The UI unit 14 has a display function for displaying various types of information and an input function for receiving an operation instruction from a user. In the present embodiment, the UI unit 14 includes a display unit 14A and an input unit 14B. The display unit 14A is a display that displays various types of information. The input unit 14B is a device that receives an operation input from the user. The input unit 14B is, for example, a pointing device such as a mouse, a keyboard, or the like. The UI unit 14 may be a touch panel in which the display unit 14A and the input unit 14B are integrally configured.

The communication unit 16 communicates with an external information processing device via a network or the like. The communication unit 16 may be referred to as a communication interface, a network interface, or the like in some instances.

The control unit 20 executes information processing associated with the operations of the anomaly detection device 10. The control unit 20 includes an acquisition unit 22, a first derivation unit 24, a second derivation unit 26, an anomaly degree derivation unit 28, and a display control unit 30.

The acquisition unit 22, the first derivation unit 24, the second derivation unit 26, the anomaly degree derivation unit 28, and the display control unit 30 are implemented by, for example, one or a plurality of processors. For example, each of the above sub-units of control unit 20 may be implemented by causing a processor, such as a central processing unit (CPU), to execute a program, that is, by software. Each of the above sub-units may be implemented by a processor such as a dedicated integrated circuit (IC), that is, hardware. Each of the above sub-units may be implemented by using software and hardware in combination. When a plurality of processors are used, each processor may implement one sub-unit, or may implement two or more of the sub-units. Furthermore, one or more of the above-mentioned sub-units (or the functions thereof) may be provided by an external information processing device connected to the anomaly detection device 10 via a network.

The acquisition unit 22 acquires input data.

The input data is data in which the anomaly detection device 10 detects anomalies. The input data in this example is visual information such as still image data (photo images) or moving image data (video). The input data is preferably tensor data that does not include time information.

The acquisition unit 22 may also acquire tensor data including time information. In this case, the acquisition unit 22 may convert the acquired tensor data into a format that does not include time information.

The present embodiment describes, as one example, input data which is color still image data expressed as three-dimensional tensor data. In the following, color still image data may be referred to simply as an image or the like.

Figure 2A:
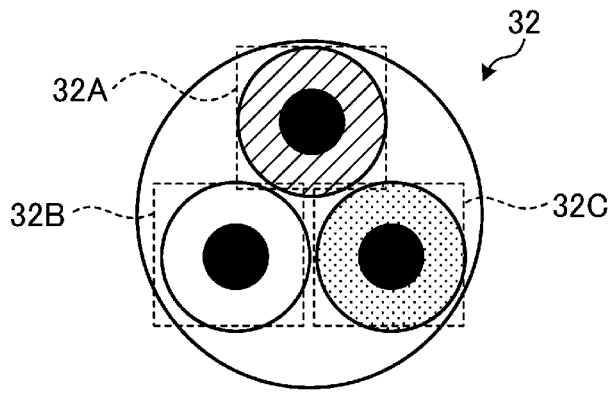
FIG. 2A is a schematic diagram of normal or correct data.
Figure 2B:
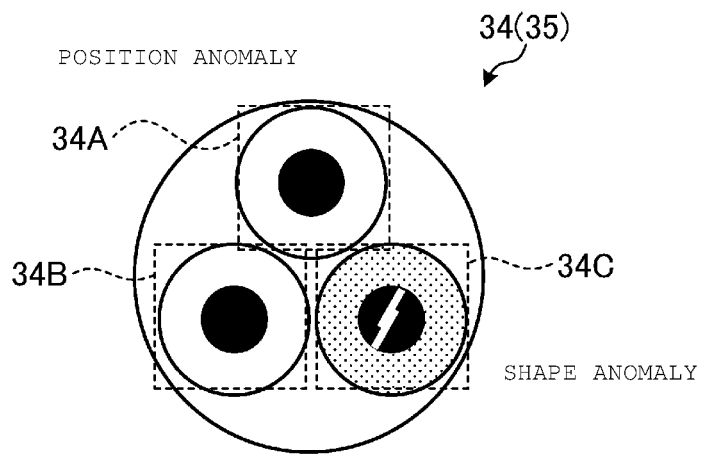
FIG. 2B is a schematic diagram of anomaly input data.
Figure 2C:
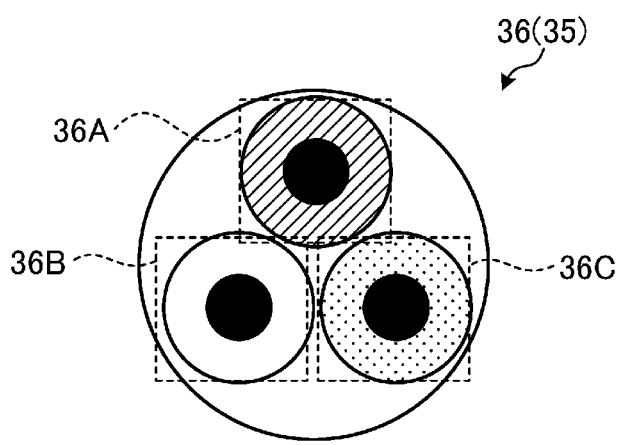
FIG. 2C is a schematic diagram of normal input data.

FIGS. 2A to 2C are schematic diagrams showing examples of normal data 32 and input data 35. FIGS. 2A to 2C show the normal data 32 and the input data 35 are images of a cross section of a bundled cable or the like in which a plurality of cables are bundled together.

FIG. 2A is a schematic diagram showing an example of the normal data 32. The normal data 32 is an example of an image of normal data used for training. That is, the normal data 32 is considered to lack any anomaly. As shown in FIG. 2A, it is assumed that the normal data 32 includes a region 32A, a region 32B, and a region 32C, which are cross-sectional regions of each of three cables.

FIG. 2B is a schematic diagram showing an example of an anomaly input data 34. The anomaly input data 34 is an example of the input data 35 including a position anomaly region 34A and/or a shape anomaly region 34C.

Specifically, the relative positional relationship of each of the position anomaly region 34A, the normal region 34B, and the shape anomaly region 34C included in the anomaly input data 34 corresponds to the relative positional relationship of each of the region 32A, the region 32B, and the region 32C of the normal data 32.

The position anomaly region 34A is a region showing a position anomaly. The region (34A) showing a position anomaly has the same pattern as the normal region 32B included in the normal data 32, but is a region having an abnormal relative positional relationship with other regions. That is, though the region 34A looks similar in pattern to region 32B, such a pattern corresponding region 32B is in an improper/incorrect position when at the position of region 34A in the cable bundle.

Thus, in this context a relative positional relationship refers a relative positional relationship between a certain region included in the input data 35 and another region of which at least a part does not overlap with the region. A pattern of a region means a color and shape as represented by one or more elements in the region. In other words, the pattern means the color and shape of one or more objects contained in a region. Therefore, the fact that the relative positional relationship is abnormal means that the set of patterns in the two regions having the relative positional relationship does not exist in the normal data 32, in the input data 35.

In the present embodiment, the position anomaly region 34A is shown as an example of a region having an abnormal relative positional relationship. The position anomaly region 34A is locally the same pattern as the region 32B included in the normal data 32, but is otherwise a normal region as judged only by pattern. However, when the relative positional relationship between the position anomaly region 34A and the normal region 34B is considered, anomaly becomes apparent in the comparison to normal data 32. The set of the patterns of the two regions 34A and 34B with the relative positional relationship in input data 35 does not exist in the normal data 32. Therefore, the relative positional relationship between the position anomaly region 34A and the normal region 34B is abnormal. Similarly, the relative positional relationship between the position anomaly region 34A and the shape anomaly region 34C can be determined to be abnormal.

The normal region 34B is a region that does not include a shape anomaly. The pattern of the normal region 34B matches that of the region 32B included in the normal data 32.

The shape anomaly region 34C is a region including a shape anomaly. The pattern of the shape anomaly region 34C does not exist in the normal data 32. FIG. 2B shows, as an example, an image region in which a part of the cable is cracked as a shape anomaly region 34C.

FIG. 2C is a schematic diagram showing an example of normal input data 36. The normal input data 36 is an example of the input data 35 which is substantially the same as the normal data 32 and does not include a shape anomaly or a position anomaly.

Specifically, the normal region 36A, the normal region 36B, and the normal region 36C included in the normal input data 36 have the same patterns as the region 32A, the region 32B, and the region 32C of the normal data 32. The relative positional relationship of each of the normal region 36A, the normal region 36B, and the normal region 36C coincides with the relative positional relationship of each of the region 32A, the region 32B, and the region 32C. In other words, the normal region 36A, the normal region 36B, and the normal region 36C are normal regions that do not include shape anomalies or relative positional relationship anomalies.

The acquisition unit 22 acquires input data 35 which may be anomaly input data 34 or normal input data 36. The acquisition unit 22 acquires the input data 35 by reading the input data 35 from the memory unit 12. The acquisition unit 22 may acquire the input data 35 from an external information processing device via the communication unit 16.

Returning to FIG. 1, the description will be continued.

The first derivation unit 24 derives a first anomaly degree according to the difference between first feature data derived from the input data 35 by using a trained deep model (deep learning model) and second feature data derived from the input data 35 by using a prediction model.

Figure 3:
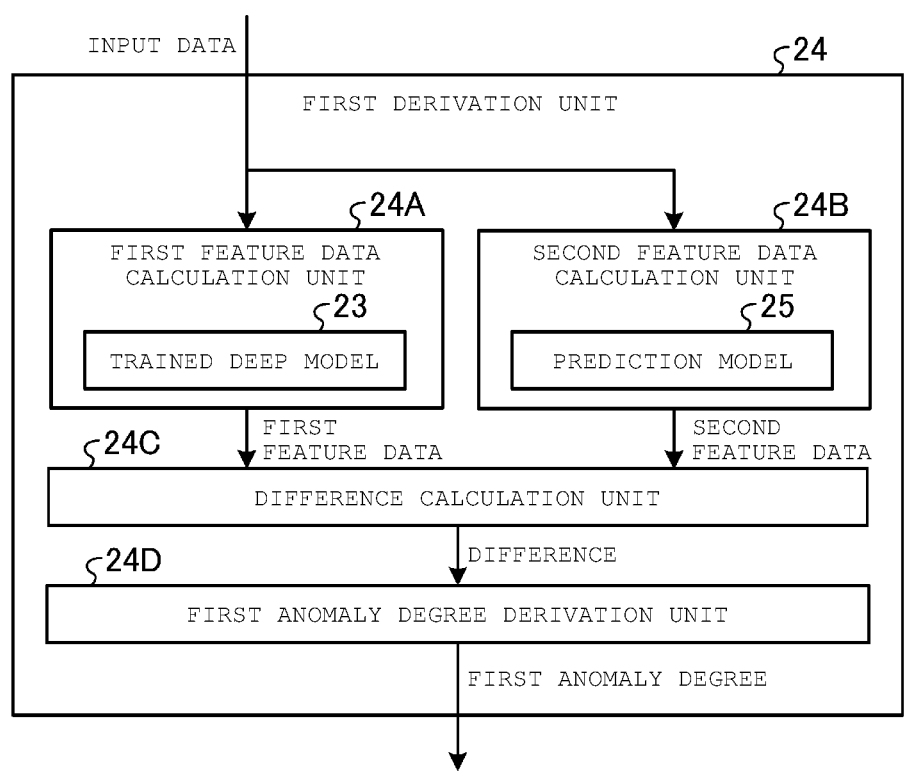
FIG. 3 is a functional block diagram of a first derivation unit.

FIG. 3 is a functional block diagram of an example of the first derivation unit 24.

The first derivation unit 24 includes a first feature data calculation unit 24A, a second feature data calculation unit 24B, a difference calculation unit 24C, and a first anomaly degree derivation unit 24D.

The first feature data calculation unit 24A calculates the first feature data from the input data 35 by using a trained deep model 23.

The trained deep model 23 is a trained deep learning model into which the input data 35 is input and the first feature data is output. The trained deep model 23 is trained in advance by using another data set or natural data or the like.

In this context, natural data can be various types of data and is not limited to data corresponding specifically to the input data 35. In other words, the natural data is various types of data that are not limited to the target data for which an anomaly has been detected by the anomaly detection device 10 itself. For example, it is assumed that the target data from which an anomaly is detected by the anomaly detection device 10 is an image of a cross section of the bundled cable shown in FIGS. 2A to 2C. In this case, the natural data can be various types of data such as an image of a cross section of a bundled cable, an image of another industrial product, an image of an animal, an image of a landscape, or the like.

The trained deep model 23 is trained by using a known algorithm type such as a convolutional neural network (CNN), recurrent neural network (RNN), or long short-term memory (LSTM).

By inputting the input data 35 into the trained deep model 23, the first feature data calculation unit 24A provides the first feature data for each element of the input data 35 as the output from the trained deep model 23.

In this context, the "element" means the regions into which the input data 35 and the normal data 32 are divided. Specifically, for example, each element is composed of one or more pixels. The present embodiment describes, as an example, a form in which each element is a region composed of a plurality of pixels.

The first feature data is feature data for each element of the input data 35 as output by the trained deep model 23. The first feature data is, for example, feature data in an Euclidean space. The first feature data may be referred to as embedded feature data.

The second feature data calculation unit 24B calculates the second feature data from the input data 35 by using a prediction model 25.

The prediction model 25 is a learning model into which the input data 35 is input and from which the second feature data is output. The prediction model 25 is pre-trained by using target data.

The target data is data of a target type from which an anomaly is detected by the anomaly detection device 10. That is, in the present embodiment, the target data is an image of a cross section of the bundled cable shown in FIGS. 2A to 2C. In the present embodiment, it is preferable that the prediction model 25 is pre-trained by using a plurality of pieces of normal data 32 (see FIG. 2A) among the target data.

The prediction model 25 is a model trained by using an algorithm such as CNN, RNN, LSTM, or the like.

By inputting the input data 35 to the prediction model 25, the second feature data calculation unit 24B obtains the second feature data for each element of the input data 35 as the output from the prediction model 25.

The second feature data is feature data for each element of the input data 35 as output by the prediction model 25. The second feature data is, for example, feature data in the Euclidean space. The second feature data may be referred to as embedded feature data.

The difference calculation unit 24C then calculates the difference between the first feature data and the second feature data. The difference calculation unit 24C calculates the difference between the first feature data received from the first feature data calculation unit 24A and the second feature data received from the second feature data calculation unit 24B for each element.

The present embodiment describes, as an example, a form in which each of the first feature data and the second feature data are in Euclidean space. Therefore, the difference between the first feature data and the second feature data corresponds to a distance in Euclidean space, that is, a Euclidean distance.

The first anomaly degree derivation unit 24D calculates the first anomaly degree according to the difference between the first feature data and the second feature data. The first anomaly degree may be a value that does not necessarily decrease monotonically as the distance between the first feature data and the second feature data increases.

The first anomaly degree derivation unit 24D derives, for example, the square of the difference between the first feature data and the second feature data or the simple difference between the first feature data and the second feature data as the first anomaly degree.

Specifically, in this example, the first anomaly degree derivation unit 24D calculates the first anomaly degree by the following Equation (1):

$$\sigma_i^r = d_i^2 = \|X_i - Y_i\|_2^2 \|x\|_2 \quad (A)$$

In Equation (1), $\sigma^r$ represents the first anomaly degree; d represents the difference between the first feature data and the second feature data; i represents the position of an element in the input data 35; X represents the first feature data; and Y represents the second feature data. Operator (A) in Equation (1) represents an L2 norm of X. The L2 norm is the square root of the sum of squares of the differences between the vector components of X.

In the present embodiment, the first anomaly degree derivation unit 24D derives the first anomaly degree for each element of the input data 35. That is, the first anomaly degree derivation unit 24D derives the first anomaly degree for each element according to the difference between the first feature data and the second feature data for each element.

Figure 4A:
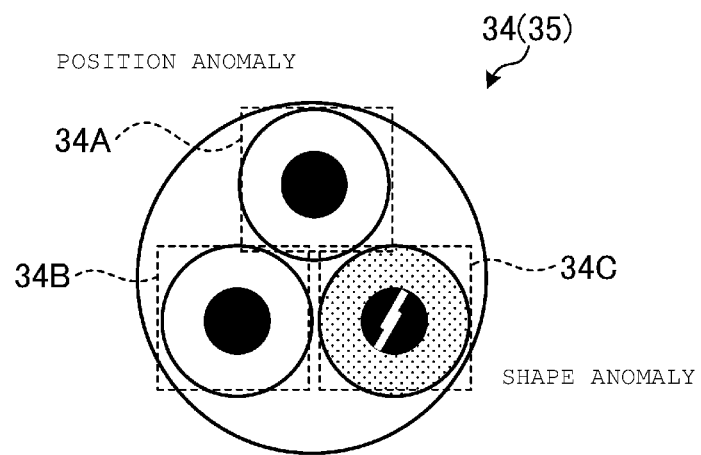
FIG. 4A is an explanatory diagram related to a deriving of a first anomaly degree.
Figure 4B:
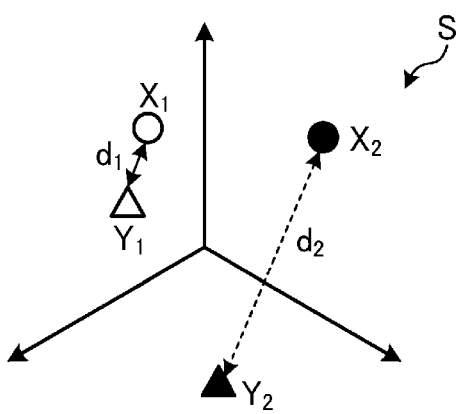
FIG. 4B is an explanatory diagram related to a deriving of a first anomaly degree.
Figure 4C:
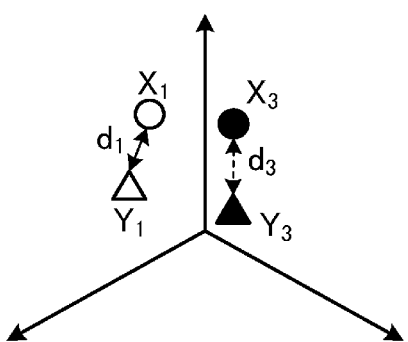
FIG. 4C is an explanatory diagram related to a deriving of a first anomaly degree.

FIGS. 4A to 4C are explanatory diagrams related to an example of deriving the first anomaly degree. FIGS. 4A to 4C show, as an example, a form in which there is a position anomaly region 34A and the shape anomaly region 34C.

FIG. 4A is a schematic diagram of the anomaly input data 34, which is an example of the input data 35. The anomaly input data 34 shown in FIG. 4A is the same as the anomaly input data 34 shown in FIG. 2B.

FIG. 4B is an explanatory diagram of an example of the difference between the feature data of the normal region 34B and the shape anomaly region 34C when the anomaly input data 34 is used as the input data 35. FIG. 4B shows an example in which the first feature data and the second feature data are disposed in a feature data space S. The feature data space S is an Euclidean space. That is, the feature data space S is a multidimensional space defined by a plurality of factor directions that define the embedded feature data.

For example, the difference calculation unit 24C calculates a difference $d_1$ between first feature data $X_1$ and second feature data $Y_1$ in the normal region 34B of the anomaly input data 34. Similarly, the difference calculation unit 24C calculates a difference $d_2$ between first feature data $X_2$ and second feature data $Y_2$ in the shape anomaly region 34C of the anomaly input data 34.

FIG. 4C is an explanatory diagram depicting the difference between the feature data of the position anomaly region 34A and the normal region 34B when the anomaly input data 34 is used as the input data 35. FIG. 4C shows an example in which the first feature data and the second feature data are disposed in the feature data space S.

For example, the difference calculation unit 24C calculates a difference $d_1$ between first feature data $X_1$ and second feature data $Y_1$ in the normal region 34B of the anomaly input data 34. Similarly, the difference calculation unit 24C calculates the difference $d_3$ between first feature data $X_3$ and second feature data $Y_3$ in the position anomaly region 34A of the anomaly input data 34.

As shown in FIG. 4B, the difference $d_1$ between the first feature data $X_1$ and the second feature data $Y_1$ in the normal region 34B and the difference $d_2$ between the first feature data $X_2$ and the second feature data $Y_2$ in the shape anomaly region 34C are significantly different. On the other hand, as shown in FIG. 4C, the difference $d_1$ between the first feature data $X_1$ and the second feature data $Y_1$ in the normal region 34B and the difference $d_3$ between the first feature data $X_3$ and the second feature data $Y_3$ in the position anomaly region 34A are substantially the same value.

Therefore, if the first anomaly degree for each element derived from each of the difference $d_1$ to the difference $d_3$ of these feature data is used as the total anomaly degree of the anomaly input data 34, it is difficult to detect a region having an abnormal relative positional relationship, such as the position anomaly region 34A, as an anomaly.

Therefore, the anomaly detection device 10 of the present embodiment includes the second derivation unit 26.

Returning to FIG. 1, the description will be continued. The second derivation unit 26 derives a second anomaly degree based on the estimation result of the relative positional relationship between a first region and a second region in the input data 35 based on the second feature data.

Figure 5:
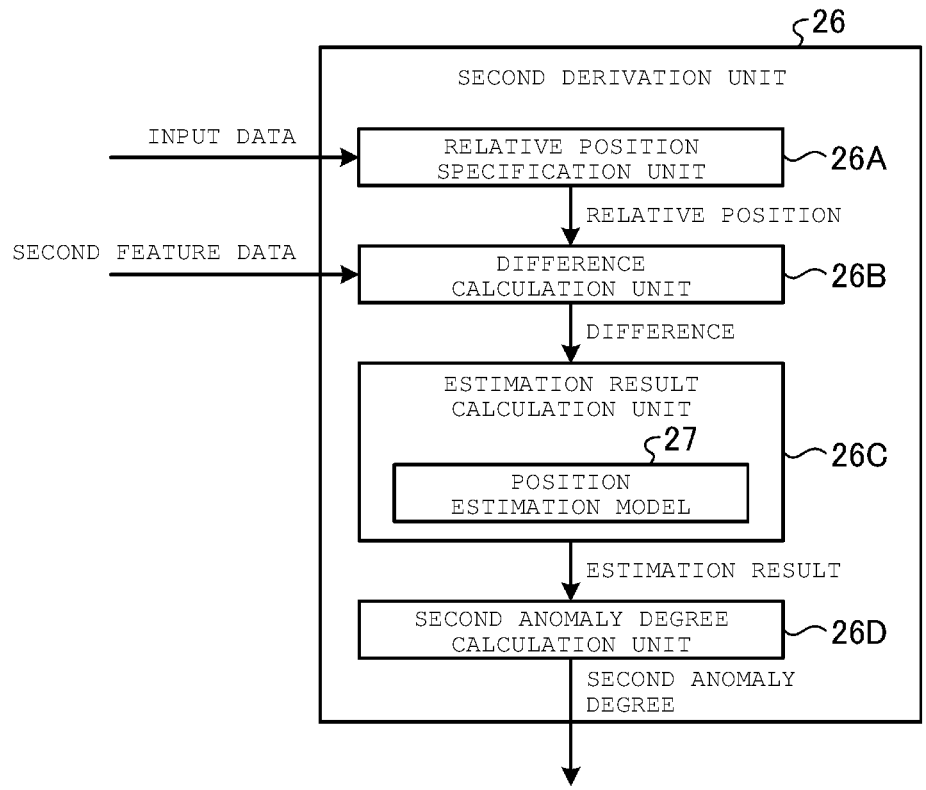
FIG. 5 is a functional block diagram of a second derivation unit.

FIG. 5 is a functional block diagram of an example of the second derivation unit 26. The second derivation unit 26 includes a relative position specification unit 26A, a difference calculation unit 26B, an estimation result calculation unit 26C, and a second anomaly degree calculation unit 26D.

The relative position specification unit 26A specifies the relative position of the input data 35. The relative position represents a relative position between the first region in the input data 35 and the second region in the input data 35.

The first region represents each of the regions into which the input data 35 is divided. The first region contains one or more elements. The second region is a region in the input data 35 of which at least a part does not overlap with the first region. The second region may be a region having the same size and outer shape as the first region, and may be a region of which at least some part does not overlap with the first region. The size of the first region and the second region is, for example, a region having a size of kernel.

Figure 6:
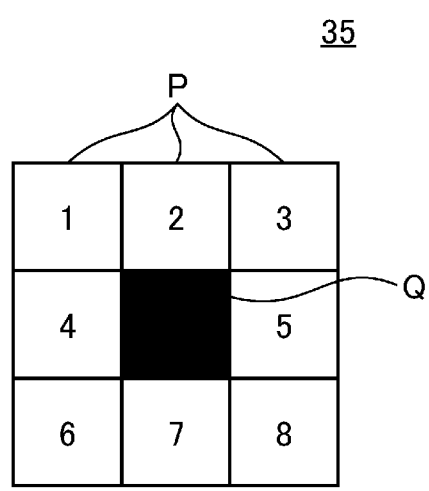
FIG. 6 is an explanatory diagram of relative positions.

FIG. 6 is an explanatory diagram related to an example of relative positions. The relative position specification unit 26A specifies each of the regions into which the input data 35 is divided as a first region Q. Then, the relative position specification unit 26A specifies the regions in a plurality of directions different from each other as a second region P for each of the specified first regions Q. The present embodiment describes, as an example, a form in which the second regions P adjacent to each other at eight relative positions 1 to 8 in eight different directions are specified for one first region Q.

The first region Q and the second regions P are regions each composed of one or a plurality of elements. As an example, a form in which the first region Q and the second region P are regions of one element is described. As described above, in the present embodiment, each element is a region composed of a plurality of pixels. Further, in the present embodiment, the first region Q and the second region P are regions having the same size and outer shape as each of the regions 32A to 32C of the normal data 32.

The difference calculation unit 26B calculates the difference between the second feature data of the first region Q and each of the second feature data of the second regions P at each of a plurality of positions relative to the first region Q, for each of a plurality of first regions Q included in the input data 35. In the present embodiment, the difference calculation unit 26B calculates the difference between the second feature data of each first region Q and each of the second feature data of the surrounding eight second regions P.

Based on the difference calculated by the difference calculation unit 26B, the estimation result calculation unit 26C calculates the certainty of that each of the possible relative positional relationships between the first region Q and the second region P is the correct relative positional relationship as the estimation result of the relative positional relationship. The certainty is expressed, for example, as a probability.

This aspect will be described with reference to FIGS. 2A and 2B. It is assumed that the position anomaly region 34A in the anomaly input data 34 shown in FIG. 2B is specified as the first region Q. In this case, the relative positional relationship between the position anomaly region 34A which is the first region Q, and the normal region 34B which is the second region P in the relative position of the direction 6 (see FIG. 6) is the correct relative positional relationship between the first region Q and the second region P of the direction 6.

The possible relative positional relationships mean all relative positional relationships (see FIG. 6) between the first region Q and the second regions P in a plurality of directions different from each other relative to the first region Q, as specified by the relative position specification unit 26A. Specifically, the possible relative positional relationships are eight relative positional relationships 1 to 8 in eight different directions adjacent to each other relative to the position anomaly region 34A which is the first region Q, including the normal region 34B which is the second region P of the direction 6, and the shape anomaly region 34C which is the second region P of the direction 8.

Based on the difference in the second feature data between the first region Q and the second region P, the estimation result calculation unit 26C calculates the certainty of that each of the possible relative positional relationships between the first region Q and the second region P is the correct relative positional relationship as an estimation result of the relative positional relationship between the first region Q and the second region P.

The estimation result calculation unit 26C inputs the difference between the second feature data of the first region Q and the second region P in the input data 35 into a position estimation model 27. Then, the estimation result calculation unit 26C obtains the certainty of that each of the possible relative positional relationships between the first region Q and the second region P is the correct relative positional relationship as an output from the position estimation model 27. Then, the estimation result calculation unit 26C uses the certainty value obtained from the position estimation model 27 as the estimation result for the relative positional relationship.

The position estimation model 27 is a model in which the difference in the second feature data between the first region Q and the second region P is input and the value representing the certainty of that each of the possible relative positional relationships of the first region Q and the second region P is the correct relative positional relationship is output. The position estimation model 27 may be a model trained in advance. The position estimation model 27 may be trained in advance by using, for example, the normal data 32 as training data.

For each of the plurality of first regions Q included in the input data 35, the estimation result calculation unit 26C uses the position estimation model 27 to calculate the estimation result which is the above-mentioned certainty, from the difference in the second feature data of each of the second regions P at the plurality of positions relative to the first region Q. Therefore, in the present embodiment, the estimation result calculation unit 26C calculates a value (estimation result) indicating certainty for each of the relative positional relationships between the first region Q and each of the eight second regions P for each of the first region Q. The present embodiment describes, as an example, a value representing certainty that is expressed as an estimation probability distribution.

The second anomaly degree calculation unit 26D derives the second anomaly degree based on the estimation result calculated by the estimation result calculation unit 26C.

Figure 7A:
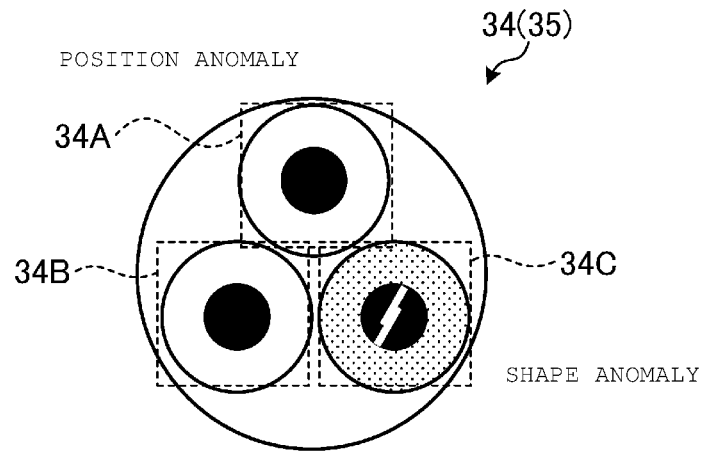
FIG. 7A is an explanatory diagram related to description of processing of a second derivation unit.
Figure 7B:
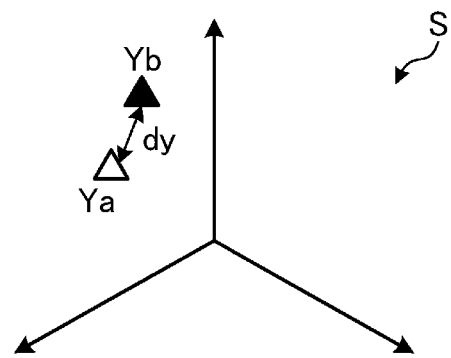
FIG. 7B is an explanatory diagram of related to description of processing of a second derivation unit.
Figure 7C:
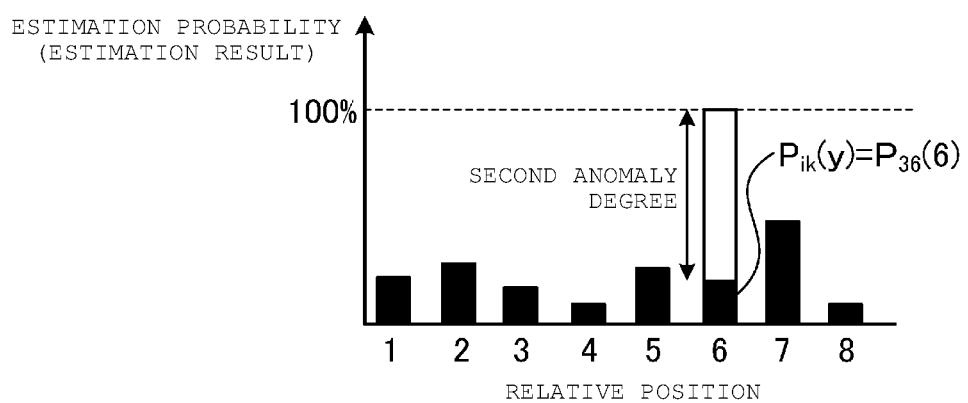
FIG. 7C is an explanatory diagram related to description of processing of a second derivation unit.

FIGS. 7A to 7C are explanatory diagrams of an example of processing by the second derivation unit 26.

FIG. 7A is a schematic diagram showing an example of the anomaly input data 34. The anomaly input data 34 shown in FIG. 7A is the same as the anomaly input data 34 shown in FIG. 2B. For example, it is assumed that the acquisition unit 22 acquires the anomaly input data 34 as the input data 35.

The relative position specification unit 26A of the second derivation unit 26 specifies the relative position of the anomaly input data 34. That is, the second derivation unit 26 specifies the second regions P at a plurality of relative positions in different directions relative to the first region Q for each of the plurality of first regions Q included in the anomaly input data 34.

For example, when the position anomaly region 34A is the first region Q, the relative position specification unit 26A specifies the normal region 34B as the second region P at the relative position of the direction 6, and the shape anomaly region 34C as the second region P at the relative position of the direction 8. Similarly, the relative position specification unit 26A specifies each of the second regions P at the positions of the directions 1 to 5, and 7 relative to the position anomaly region 34A which is the first region Q (see also FIG. 6).

FIG. 7B is an explanatory diagram of an example of the difference in the second feature data between the position anomaly region 34A (which is the first region Q) and the normal region 34B (which is the second region P at the position relative to the position anomaly region 34A of the direction 6). FIG. 7B shows the second feature data disposed in the feature data space S.

In this case, the difference calculation unit 26B calculates a difference dy between second feature data Yb of the position anomaly region 34A and second feature data Ya of the normal region 34B as the difference in the second feature data of the first region Q and the second region P at the relative position of the direction 6. Similarly, the difference calculation unit 26B calculates the difference in the second feature data of each of the second regions P at the positions of the various directions 1 to 5 and 7 to 8 relative to the position anomaly region 34A which is the first region Q (see also FIG. 6).

FIG. 7C is an explanatory diagram of an example of the estimation result. In FIG. 7C, the horizontal axis indicates the possible relative position of the second region P relative to the first region Q. The vertical axis indicates the estimation probability value. An estimation probability of 100% means the probability that each of the possible relative positional relationships matches the correct relative positional relationship.

Specifically, FIG. 7C is a schematic diagram showing an example of an estimation probability distribution for possible relative positions in each of the potential directions 1 to 8 output by the position estimation model 27 when the first region Q is the position anomaly region 34A and the second region P is the normal region 34B at a position of the direction 6 relative to the first region Q.

When the relative positional relationship between the position anomaly region 34A, and the normal region 34B is a normal relative positional relationship, the estimation probability of the relative position 6 having a correct relative position is 100%, and the estimation probability of any other possible relative position other than 6 is 0%. As described above, the position anomaly region 34A is a region having an abnormal relative positional relationship with another region (second region P). Therefore, as shown in FIG. 7C, the distribution of the estimation probabilities of the relative positional relationship in the position anomaly region 34A and the normal region 34B is different from the distribution of the estimation probabilities of the relative positional relationship in the case of a normal (correct) relative positional relationship.

Therefore, the second anomaly degree calculation unit 26D derives the second anomaly degree relating to the estimation result based on the estimation results for each relative positional relationship with each of the plurality of second regions P, which are derived for each of the plurality of first regions Q included in the input data 35 by the estimation result calculation unit 26C.

Specifically, based on the above certainty, the second anomaly degree calculation unit 26D calculates the difference between the estimation probability that the relative positional relationship is the correct relative positional relationship and the probability of 100%, or the negative log-likelihood of the estimation probability, or the entropy of the certainty, as the second anomaly degree for each relative positional relationship of the first region Q.

For example, the second anomaly degree calculation unit 26D calculates the second anomaly degree by the following Equation (2):

$$\sigma_{i_k}^P = 100\% - P_{i_k}(y)$$

Equation (2) is for calculating a difference between the estimation probability and the probability of 100% as the second anomaly degree. In Equation (2), $\sigma^P$ represents the second anomaly degree; P(y) represents the estimation probability of the correct relative position y; i represents the position of the first region Q in the input data 35; and k represents a position relative to i. In the present embodiment, k indicates each of the above-mentioned relative positions in eight directions, and is thus expressed by an integer value of 1 to 8.

For example, as shown in FIG. 7C, the second anomaly degree calculation unit 26D calculates the difference between the estimation probability and the probability of 100% as the second anomaly degree. That is, it is assumed that the estimation result calculation unit 26C calculates the estimation probability of that each of the possible relative positions 1 to 8 is the correct relative positional relationship for the relative positional relationship between the position anomaly region 34A which is the first region Q, and the normal region 34B which is the second region P at the position of the direction 6 relative to the first region Q. That is, as shown in FIG. 7C, in one first region Q and one second region P, a value indicating the certainty of the correct relative positional relationship is obtained for each of the eight possible relative positions. The value is typically expressed as a probability distribution.

In this case, the second anomaly degree calculation unit 26D specifies the estimation probability $P_{ik}(y)=P_{36}(6)$ for the direction 6 which is the correct relative position of the normal region 34B relative to the position anomaly region 34A among the estimation probabilities of each of these possible relative positions 1 to 8. Then, by using the above Equation (2), the second anomaly degree calculation unit 26D calculates a value obtained by subtracting the estimation probability $P_{36}(6)$ from 100% as the second anomaly degree of the relative positional relationship between the position anomaly region 34A which is the first region Q and the normal region 34B at the relative position of the direction 6.

As described above, the second anomaly degree calculation unit 26D may calculate the difference between the estimation probability and the probability of 100%, or the negative log-likelihood of the estimation probability, or the entropy of the estimation probability as the second anomaly degree for each of the relative positional relationships of the first region Q.

For example, the second anomaly degree calculation unit 26D may calculate the second anomaly degree by the following Equation (3) or Equation (4).

$$\sigma_{i_k}^p = -\log P_{i_k}(y) \qquad \text{Equation (3):}$$

Equation (3) is an equation for calculating the negative log-likelihood of the estimation probability as the second anomaly degree. In Equation (3), $\sigma^p$, P(y), i, and k are the same as those in the above Equation (2).

$$\sigma_{i_k}^p = \sum_j -P_{i_k}(j)\log(P_{i_k}(j)) \qquad \text{Equation (4)}$$

Equation (4) is an equation for calculating the entropy of the estimation probability as the second anomaly degree. In Equation (4), $\sigma^p$, i, and k are the same as those in the above Equation (2). $P_{ik}(j)$ is the estimation probability of a possible relative position j of 1 to 8 in the relative positional relationship of the second region P at the position k relative to the position i of the first region Q in the input data 35.

Then, the second anomaly degree calculation unit 26D performs the above processing for each of the positions in each of the directions 1 to 8 relative to one first region Q. Therefore, in the present embodiment, the second anomaly degree calculation unit 26D calculates eight second anomaly degrees, which is the number of surrounding second regions P, for each first region Q. The second anomaly degree calculation unit 26D uses, for example, the average value of eight surrounding second anomaly degrees calculated for one first region Q as the second anomaly degree of the element which is the first region Q.

Figure 8A:
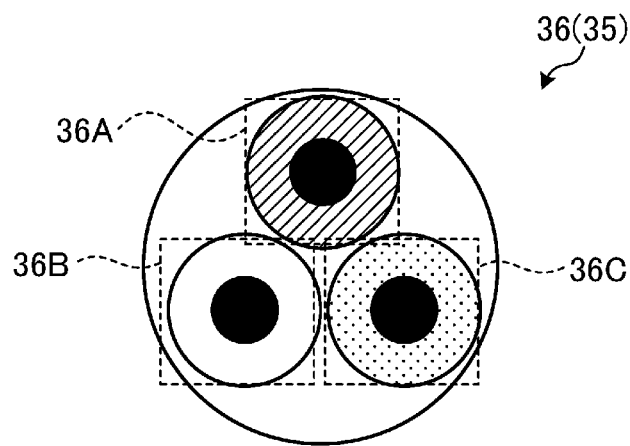
FIG. 8A is an explanatory diagram related to description of processing of a second derivation unit.
Figure 8B:
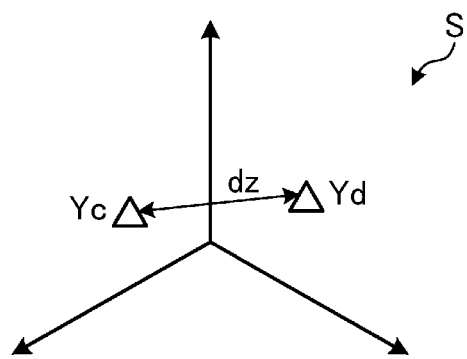
FIG. 8B is an explanatory diagram related to description of processing of a second derivation unit.
Figure 8C:
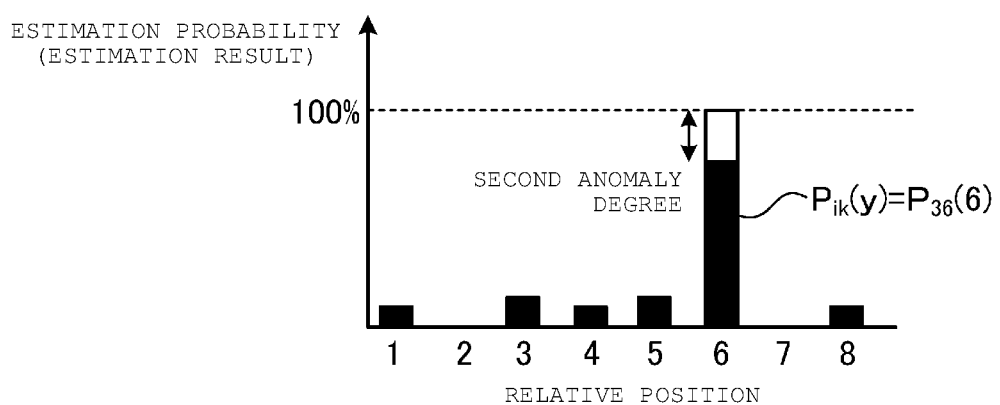
FIG. 8C is an explanatory diagram related to description of processing of a second derivation unit.

FIGS. 8A to 8C are explanatory diagrams of an example of processing by the second derivation unit 26.

FIG. 8A is a schematic diagram showing an example of the normal input data 36. The normal input data 36 shown in FIG. 8A is the same as the normal input data 36 shown in FIG. 2C. For example, it is assumed that the acquisition unit 22 acquires the normal input data 36 as the input data 35.

The relative position specification unit 26A of the second derivation unit 26 specifies the relative position of the normal input data 36. That is, the second derivation unit 26 specifies the second regions P at a plurality of relative positions for each of the plurality of first regions Q included in the normal input data 36.

For example, when the normal region 36A is the first region Q, the relative position specification unit 26A specifies the normal region 36B as the second region P at the relative position of the direction 6, and specifies the normal region 36C as the second region P at the relative position of the direction 8. Similarly, the relative position specification unit 26A specifies each of the second regions P at the positions of the directions 1 to 5, and 7 relative to the normal region 36A which is the first region Q (see also FIG. 6).

FIG. 8B is an explanatory diagram of an example of the difference in the second feature data between the normal region 36A, which is the first region Q, and the normal region 36B, which is the second region at the position of the direction 6 relative to the normal region 36A. FIG. 8B shows the second feature data disposed in the feature data space S.

In this case, the difference calculation unit 26B calculates a difference dz between second feature data Yd of the normal region 36A and second feature data Yc of the normal region 36B as the difference in the second feature data between the first region Q (normal region 36A) and the second region P (normal region 36B) located in the direction 6 relative to the first region Q. Similarly, the difference calculation unit 26B calculates the difference in the second feature data of each of the second regions P at the positions of the various directions 1 to 5 and 7 to 8 relative to the normal region 36A which is the first region Q (see also FIG. 6).

FIG. 8C is an explanatory diagram of an example of the estimation result. In FIG. 8C, the horizontal axis indicates the possible relative position of the second region P relative to the first region Q. The vertical axis indicates the estimation probability value, where the estimation probability of 100% means the probability that each of the possible relative positional relationships matches the correct relative positional relationship.

Specifically, FIG. 8C is a schematic diagram showing an example of an estimation probability distribution for possible relative positions in each of the directions 1 to 8 output by the position estimation model 27 when the first region Q is the normal region 36A and the second region P is the normal region 36B at a relative position of the direction 6 relative to the first region Q.

As described above, when the relative positional relationship between the normal region 36A which is the first region Q, and the normal region 36B which is the second region P at a position of the direction 6 relative to the normal region 36A, is a normal relative positional relationship, the estimation probability of the relative position 6 having a correct relative position is 100%, and the estimation probability of the relative position other than 6 is 0%. Therefore, the estimation probability $P_{ik}(y)=P_{36}(6)$ of the relative position 6 which is the correct relative position between the normal region 36A and the normal region 36B, whose relative positional relationship substantially matches the normal relative positional relationship is higher than the estimation probability $P_{ik}(y)=P_{36}(6)$ of the relative position 6 which is the correct relative position between the position anomaly region 34A and the normal region 34B shown in FIG. 7C.

The second anomaly degree calculation unit 26D calculates the second anomaly degree for each first region Q of the normal input data 36 by using any one of the above Equations (2) to (4).

In this way, the second derivation unit 26 calculates the second anomaly degree for each of the first regions Q based on the second feature data. The second anomaly degree is thus a value relating to the estimation result of the relative positional relationship between the first region Q in the input data 35 and the surrounding second regions P. Therefore, the second derivation unit 26 may derive a high level of second anomaly degree even for a region that locally has a same pattern included in the normal data 32 and that is normal in shape but is abnormal in just the relative positional relationship.

Then, the second derivation unit 26 outputs the second anomaly degree derived for each of the first regions Q of the input data 35, that is, for each element, to the anomaly degree derivation unit 28.

The anomaly degree derivation unit 28 acquires the first anomaly degree for each element from the first derivation unit 24. The anomaly degree derivation unit 28 also acquires the second anomaly degree for each element from the second derivation unit 26.

The anomaly degree derivation unit 28 calculates the total anomaly degree of the input data 35 from the first anomaly degree and the second anomaly degree.

For example, the anomaly degree derivation unit 28 specifies the first anomaly degree and the second anomaly degree for each element included in the input data 35. Then, the anomaly degree derivation unit 28 derives the sum of the first anomaly degree and the second anomaly degree of each element or a multiplication value of the first anomaly degree and the second anomaly degree of each element as the total anomaly degree for each element included in the input data 35.

The anomaly degree derivation unit 28 derives the maximum value of the total anomaly degree for each element included in the input data 35 as the total anomaly degree of the entire input data 35.

Next, the display control unit 30 will be described.

The display control unit 30 displays at least one of the input data 35 acquired by the acquisition unit 22, the first anomaly degree derived by the first derivation unit 24, the second anomaly degree derived by the second derivation unit 26, and the total anomaly degree derived by the anomaly degree derivation unit 28 on the display unit 14A.

For example, the display control unit 30 superimposes at least one of the first anomaly degree, the second anomaly degree, and the total anomaly degree on the image of the input data 35 to be displayed on the display unit 14A. Specifically, the display control unit 30 displays on the display unit 14A at least one of the first anomaly degree, the second anomaly degree, and the total anomaly degree of each element in the input data in a superimposed manner at the position corresponding to an element in the image of the input data 35.

Specifically, for example, the display control unit 30 displays on the display unit 14A a heat map in which each element of the input data 35 is represented by a color and a density corresponding to the value of the anomaly degree for each of the first anomaly degree, the second anomaly degree, and the total anomaly degree. Each heat map may be superimposed and displayed on the image of the input data 35, or may be displayed without being superimposed.

FIG. 9A is a schematic diagram of an example of a display screen 50. For example, for the input data 35, the display control unit 30 displays the display screen 50 including a heat map of the total anomaly degree, a heat map in which the first anomaly degree and the second anomaly degree are superimposed, a heat map of the first anomaly degree, and a heat map of the second anomaly degree on the display unit 14A. The display control unit 30 may further display numerical values representing the values of the first anomaly degree, the second anomaly degree, and the total anomaly degree together with these heat maps.

By displaying the heat map of the total anomaly degree on the display unit 14A, the display control unit 30 may provide the user with the total anomaly degree of the entire input data 35 and each element included in the input data 35 in an easy and visible manner. Furthermore, by displaying the heat map in which the first anomaly degree and the second anomaly degree are superimposed on the display unit 14A, the display control unit 30 may provide the user with information indicating the first anomaly degree and the second anomaly degree of each of the elements included in the input data 35 in an easy and visible manner.

The display control unit 30 may individually display at least one of the first anomaly degree, the second anomaly degree, and the total anomaly degree on the display unit 14A. Specifically, at least one of the heat map of the first anomaly degree, the heat map of the second anomaly degree, and the heat map of the total anomaly degree may be individually displayed on the display unit 14A. For example, as shown in FIG. 9A, the display control unit 30 may individually display the heat map of the first anomaly degree and the heat map of the second anomaly degree on the display unit 14A. In this case, the display control unit 30 may further display the ratio of the anomaly degree of each element to the total value of the anomaly degrees of all the elements of the input data 35 for each element, in each of the heat maps of the first anomaly degree and the second anomaly degree.

FIG. 9B is a schematic diagram of an example of a display screen 52. The display screen 52 is an example of a display screen that mainly displays the second anomaly degree which is an anomaly in the relative positional relationship. For example, the display control unit 30 displays the display screen 52 including a heat map of the first anomaly degree of the first region Q and individual heat maps of the second anomaly degree of the second regions P at positions in each of the eight directions relative to the first region Q on the display unit 14A for each of the plurality of first regions Q specified in the input data 35. FIG. 9B shows an example of displaying each heat map of the first anomaly degree of the first region Q at a certain position and the second anomaly degree of the second regions P at positions in each of the eight directions relative to the first region Q.

Then, if the first region Q at another position is selected by an operation instruction of the input unit 14B by the user, the display control unit 30 may display the display screen 52 corresponding to the selected first region Q on the display unit 14A. In addition, instead of the first anomaly degree of the first region Q, the average value of the second anomaly degree of the relative positional relationship with each of the second regions P at the positions in the eight directions relative to the first region Q may be displayed on the display unit 14A.

By displaying the display screen 52 on the display unit 14A, the display control unit 30 may clearly display the grounds for deriving the second anomaly degree which is the anomaly degree of the relative relationship, and the position of the second region P relative to the first region Q used for deriving the second anomaly degree.

In this way, the display control unit 30 displays at least one of the input data 35 (e.g., a still image) acquired by the acquisition unit 22, the first anomaly degree derived by the first derivation unit 24, the second anomaly degree derived by the second derivation unit 26, and the total anomaly degree derived by the anomaly degree derivation unit 28 on the display unit 14A. Therefore, the display control unit 30 may provide the user with the first anomaly degree, the second anomaly degree, and the total anomaly degree of the input data 35 in an easy-to-understand and visible manner. Furthermore, the display control unit 30 may provide the user with the first anomaly degree, the second anomaly degree, and the total anomaly degree for each element in the input data 35.

Next, the procedure of the anomaly detection processing executed by the anomaly detection device 10 will be described.

Figure 10:
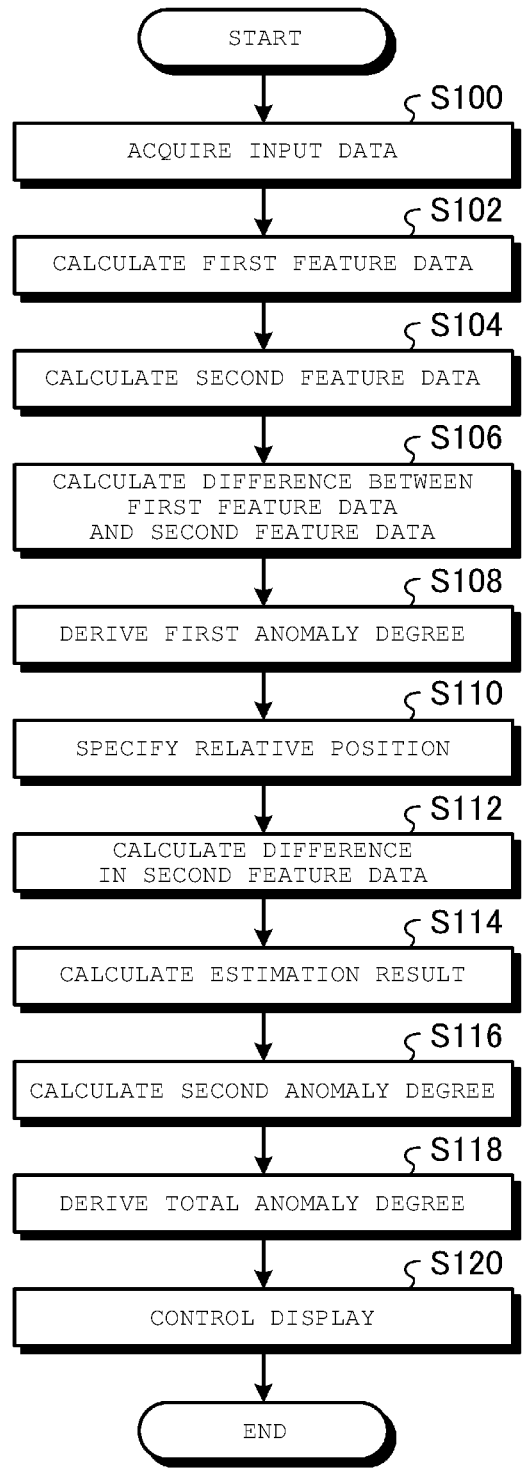
FIG. 10 is a flowchart showing an example of anomaly detection processing.

FIG. 10 is a flowchart showing an example of anomaly detection processing executed by the anomaly detection device 10.

The acquisition unit 22 acquires the input data 35 (step S100).

The first feature data calculation unit 24A calculates the first feature data for each element from the input data 35 by using the trained deep model 23 (step S102).

The second feature data calculation unit 24B calculates the second feature data for each element from the input data 35 by using the prediction model 25 (step S104).

The difference calculation unit 24C calculates the difference between the first feature data calculated in step S102 and the second feature data calculated in step S104 for each element (step S106).

The first anomaly degree derivation unit 24D calculates the first anomaly degree according to the difference between the first feature data and the second feature data calculated in step S106 (step S108). For example, the first anomaly degree derivation unit 24D calculates the square of the difference between the first feature data and the second feature data as the first anomaly degree.

The relative position specification unit 26A specifies the relative element positional relationship in the input data 35 (step S110). For example, the relative position specification unit 26A specifies the second regions P at eight relative positions adjacent to each other in eight directions different from the first region Q for each of the first regions Q into which the input data 35 is divided.

The difference calculation unit 26B calculates the difference between the second feature data of the first region Q and each of the second feature data of the second region P at each of a plurality of relative positions relative to the first region Q, for each of the first regions Q included in the input data 35 (step S112).

Based on the difference calculated in step S112, the estimation result calculation unit 26C calculates the certainty of that each of the possible relative positional relationships between the first region Q and the second regions P is the correct relative positional relationship as the estimation result of the relative positional relationship (step S114).

The second anomaly degree calculation unit 26D calculates the second anomaly degree based on the estimation result calculated in step S114 (step S116).

The anomaly degree derivation unit 28 derives the total anomaly degree (step S118). The anomaly degree derivation unit 28 receives the first anomaly degree derived in step S108 and the second anomaly degree derived in step S116 for each element included in the input data 35. Then, the anomaly degree derivation unit 28 calculates the sum of the first anomaly degree and the second anomaly degree of each element or the multiplication value of the first anomaly degree and the second anomaly degree of each element as the total anomaly degree for each element included in the input data 35. Furthermore, the anomaly degree derivation unit 28 derives the maximum value of the total anomaly degree for each element included in the input data 35 as the total anomaly degree of the entire input data 35.

The display control unit 30 displays the input data 35 acquired by the acquisition unit 22 in step S100, the first anomaly degree derived in step S108, the second anomaly degree derived in step S116, and the total anomaly degree derived in step S118 on the display unit 14A (step S120). The processing then ends.

As described above, the anomaly detection device 10 includes the acquisition unit 22, the first derivation unit 24, the second derivation unit 26, and the anomaly degree derivation unit 28. The acquisition unit 22 acquires the input data 35. The first derivation unit 24 derives the first anomaly degree according to the difference between first feature data derived from the input data 35 by using the trained deep model 23 trained by using natural data and second feature data derived from the input data 35 by using the prediction model 25 trained by using target data. The second derivation unit 26 derives a second anomaly degree based on an estimation result of a relative positional relationship between the first region Q in the input data 35 and the second regions P based on the second feature data. The anomaly degree derivation unit 28 derives the total anomaly degree of the input data 35 from the first anomaly degree and the second anomaly degree.

As described with reference to FIG. 4B, the difference $d_1$ between the first feature data $X_1$ and the second feature data $Y_1$ in the normal region 34B of the anomaly input data 34 and the difference $d_2$ between the first feature data $X_2$ and the second feature data $Y_2$ in the shape anomaly region 34C can be significantly different. On the other hand, as shown in FIG. 4C, the difference $d_1$ between the first feature data $X_1$ and the second feature data $Y_1$ in the normal region 34B and the difference $d_3$ between the first feature data $X_3$ and the second feature data $Y_3$ in the position anomaly region 34A where the relative positional relationship is abnormal are substantially the same value.

Therefore, if the first anomaly degree for each element derived from each of the difference $d_1$ to the difference $d_3$ of the first feature data and the second feature data is used as the total anomaly degree of the anomaly input data 34, it may be difficult to detect a region having an abnormal relative positional relationship, such as the position anomaly region 34A, as an anomaly.

On the other hand, as described with reference to FIGS. 7C and 8C, the second anomaly degree shows a higher anomaly degree when the relative positional relationship is abnormal than when the relative positional relationship is normal. Specifically, the second anomaly degree derived from the estimation probability $P_{ik}(y)=P_{36}(6)$ of the correct relative position between the position anomaly region 34A and the normal region 34B having an abnormal relative positional relationship is shown in FIG. 7C, for example. On the other hand, the second anomaly degree derived from the estimation probability $P_{ik}(y)=P_{36}(6)$ of the correct relative position between the normal region 36A and the normal region 36B having a normal relative positional relationship is shown in FIG. 8C, for example. As described above, the second anomaly degree is the degree of anomaly by which a region having an abnormal relative positional relationship can be detected as an anomaly.

Therefore, the anomaly degree derivation unit 28 can calculate an anomaly degree indicating an anomaly even for the region having an abnormal relative positional relationship by calculating the total anomaly degree of the input data 35 from some combination of the first anomaly degree and the second anomaly degree.

Therefore, the anomaly detection device 10 of the present embodiment can improve the anomaly detection accuracy.

In the related art for determining the normality by using the error between the input data 35 and the output data restored from the characteristics of the input data 35, it is necessary to convolve the information of all the elements of the input data 35 into the deep feature space. Therefore, in such a related art, it is necessary to handle large amounts of information even if an anomaly can be determined by just local information. On the other hand, according to the anomaly detection device 10 of the present embodiment, the total anomaly degree is derived based on the first anomaly degree and the second anomaly degree derived by using the first feature data and the second feature data in the input data 35.

Therefore, the anomaly detection device 10 of the present embodiment can reduce the data handling load of the anomaly detection device 10 in addition to the above effects.

The anomaly detection device 10 of the present embodiment can be applied to various uses for detecting an anomaly included in input data 35. For example, the anomaly detection device 10 can be applied to a device that detects an anomaly in processes on a production line that manufactures articles. In this case, by using images of the finished article and the unfinished article at each stage of the manufacturing process of the article as the input data 35, the anomaly detection device 10 may derive the total anomaly degree for each element included in the image with high accuracy.

Figure 11:
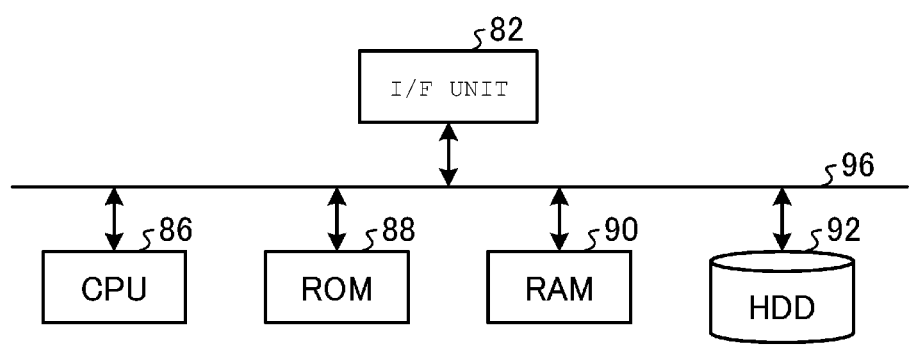
FIG. 11 is a hardware configuration diagram.

FIG. 11 is an example of a hardware configuration diagram of the anomaly detection device 10.

In the anomaly detection device 10 can have a hardware configuration corresponding to a standard computer in which a central processing unit (CPU) 86, a read only memory (ROM) 88, a random access memory (RAM) 90, an I/F 82, and the like are connected to each other by a bus 96.

The CPU 86 is an arithmetic unit that controls the anomaly detection device 10. The ROM 88 stores a program or the like that implements various described processing on the CPU 86. The RAM 90 stores data necessary for various processing by the CPU 86. The I/F 82 is an interface for communicating data.

In the anomaly detection device 10, each of the above-described functions can be implemented on a computer by the CPU 86 loading a program from the ROM 88 onto the RAM 90 and then executing the program.

A program for executing the processing executed by the anomaly detection device 10 may be stored in a hard disk drive (HDD) 92. In some examples, a program for implementing the processing executed by the anomaly detection device 10 may be stored in advance in the ROM 88.

Furthermore, a program for executing the processing of the anomaly detection device 10 may be provided as installable or executable files stored on non-transitory computer-readable storage media such as CD-ROM, CD-R, memory card, digital versatile disk (DVD), and flexible disk (FD). Likewise, such a program may be stored on a computer connected to a network, such as the Internet, and provided by downloading via the network. Similarly, such a program may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An anomaly detection device, comprising:
a processor configured to:
acquire input data including image data,
derive a first anomaly degree corresponding to a difference between first feature data derived from the input data using a trained deep model trained by using natural data and second feature data derived from the input data using a prediction model trained by using target data;
derive a second anomaly degree corresponding to an estimated relative positional relationship between a first region in the image data and a second region in the image data based on the second feature data, at least a part of the second region not overlapping with the first region, and
calculate a total anomaly degree for the input data from the first anomaly degree and the second anomaly degree.

2. The anomaly detection device according to claim 1, wherein the processor calculates a certainty value for each of the possible relative positional relationships between a plurality of the first region and the second region based on a difference between the second feature data in the first region and the second feature data in the second region.

3. The anomaly detection device according to claim 2, wherein the processor calculates, as the second anomaly degree in the first region, one of:
a difference between an estimation probability that the relative positional relationship is the correct relative positional relationship and a probability of 100%,
a negative log-likelihood of the estimation probability, and
an entropy of the certainty value.

4. The anomaly detection device according to claim 1, wherein the first anomaly degree is a value that does not decrease monotonically as a Euclidean distance between the first feature data and the second feature data increases.

5. The anomaly detection device according to claim 1, further comprising:
a display control unit configured to display at least one of the input data, the first anomaly degree, the second anomaly degree, and the total anomaly degree on a display unit.

6. The anomaly detection device according to claim 5, wherein the display control unit superimposes at least one of the first anomaly degree, the second anomaly degree, and the total anomaly degree on the input data.

7. The anomaly detection device according to claim 5, wherein the display control unit individually displays at least one of the first anomaly degree, the second anomaly degree, and the total anomaly degree with the input data.

8. The anomaly detection device according to claim 5, wherein the display control unit displays at least one of the first anomaly degree, the second anomaly degree, and the total anomaly degree of each region in the input data in a superimposed manner at a position corresponding to each region in the input data.

9. The anomaly detection device according to claim 5, wherein the display control unit individually displays at least one of the first anomaly degree, the second anomaly degree, and the total anomaly degree of each region in the input data at a position corresponding to each region in the input data.

10. The anomaly detection device according to claim 1, wherein the prediction model is trained in advance by using the target data which is normal data.

11. The anomaly detection device according to claim 1, wherein
    the processor calculates the estimated relative positional relationship based on a difference between the second feature data in the first region and the second feature data in the second region by using a position estimation model, and
    the position estimation model is pre-trained by using normal data.

12. The anomaly detection device according to claim 1, wherein the image data is video data.

13. An anomaly detection device, comprising:
    an acquisition unit configured to acquire input data;
    a first derivation unit configured to derive a first anomaly degree according to a difference between first feature data derived from the image data using a trained deep model trained using natural data and second feature data derived from the image data using a prediction model trained using target data;
    a second derivation unit configured to derive a second anomaly degree corresponding to an estimated relative positional relationship between a first element region in the image data and a second element region in the image data based on the second feature data, at least a part of the second element region not overlapping with the first element region; and
    an anomaly degree derivation unit configured to derive a total anomaly degree of the image data from the first anomaly degree and the second anomaly degree.

14. The anomaly detection device according to claim 13, wherein the second derivation unit derives a certainty value for each of the possible relative positional relationships between a plurality of the first element region and the second element region is the correct relative positional relationship based on a difference between the second feature data for the first element region and the second feature data for the second element region.

15. The anomaly detection device according to claim 13, further comprising:
    a display control unit configured to display at least one of the image data, the first anomaly degree, the second anomaly degree, and the total anomaly degree on a display unit.

16. A non-transitory computer-readable medium storing program instructions which when executed cause a computer to execute a method comprising:
    acquiring input data including image data;
    deriving a first anomaly degree corresponding to a difference between first feature data derived from the input data using a trained deep model trained by using natural data and second feature data derived from the input data using a prediction model trained by using target data;
    deriving a second anomaly degree corresponding to an estimated relative positional relationship between a first region in the image data and a second region of the image data based on the second feature data, at least a part of the second region not overlapping with the first region; and
    calculating a total anomaly degree for the input data from the first anomaly degree and the second anomaly degree.

17. The non-transitory computer-readable medium according to claim 16, the method further comprising:
    calculating a certainty value for each of the possible relative positional relationships between a plurality of the first region and the second region based on a difference between the second feature data in the first region and the second feature data in the second region.

18. The non-transitory computer-readable medium according to claim 16, wherein the image data is video data.

19. The non-transitory computer-readable medium according to claim 16, the method further comprising:
    displaying, on a display unit, at least one of the input data, the first anomaly degree, the second anomaly degree, and the total anomaly degree.

20. The non-transitory computer-readable medium according to claim 19, wherein at least one of the first anomaly degree, the second anomaly degree, and the total anomaly degree is superimposed on the input data.

* * * * *